United States Patent
West et al.

(10) Patent No.: US 9,470,269 B2
(45) Date of Patent: Oct. 18, 2016

(54) HYDRAULIC POWER UNIT

(71) Applicant: STANLEY BLACK & DECKER, INC., New Britain, CT (US)

(72) Inventors: Gabriel West, Portland, OR (US); Jeffery Weatherill, Portland, OR (US)

(73) Assignee: Stanley Black & Decker, Inc., New Britain, CT (US)

(*) Notice: Subject to any disclaimer, the term of this patent is extended or adjusted under 35 U.S.C. 154(b) by 482 days.

(21) Appl. No.: 13/973,522

(22) Filed: Aug. 22, 2013

(65) Prior Publication Data

US 2015/0052883 A1  Feb. 26, 2015

(51) Int. Cl.
| | |
|---|---|
| F16D 31/02 | (2006.01) |
| F16D 1/04 | (2006.01) |
| F15B 11/08 | (2006.01) |
| F01P 5/02 | (2006.01) |
| F01P 5/04 | (2006.01) |
| F04B 17/05 | (2006.01) |
| F04B 17/06 | (2006.01) |
| F04B 53/08 | (2006.01) |
| F16D 1/02 | (2006.01) |
| F02B 63/06 | (2006.01) |

(52) U.S. Cl.
CPC . *F16D 1/04* (2013.01); *F01P 5/02* (2013.01); *F01P 5/04* (2013.01); *F02B 63/06* (2013.01); *F04B 17/05* (2013.01); *F04B 17/06* (2013.01); *F04B 53/08* (2013.01); *F15B 11/08* (2013.01); *F16D 1/02* (2013.01); *Y10T 403/642* (2015.01); *Y10T 403/70* (2015.01); *Y10T 403/7021* (2015.01)

(58) Field of Classification Search
CPC .......................................... F16D 1/04
USPC ........................................................ 60/458
See application file for complete search history.

(56) References Cited

U.S. PATENT DOCUMENTS

| | | | |
|---|---|---|---|
| 3,586,238 A | 6/1971 | Schmierer et al. | |
| 4,094,365 A | * 6/1978 | Wanner | B06B 1/183 |
| | | | 173/105 |
| 4,211,080 A | 7/1980 | White | |
| 4,622,923 A | 11/1986 | Nishimura et al. | |
| 4,623,124 A | 11/1986 | Lewis | |
| 4,677,940 A | 7/1987 | Bracht et al. | |
| 4,779,905 A | 10/1988 | Ito et al. | |

(Continued)

FOREIGN PATENT DOCUMENTS

| | | |
|---|---|---|
| ES | 8101210 A | 3/1981 |
| GB | 2 058 298 A | 4/1981 |

(Continued)

*Primary Examiner* — Thomas E. Lazo
*Assistant Examiner* — Daniel Collins
(74) *Attorney, Agent, or Firm* — Gabriel A. Haboubi

(57) ABSTRACT

A hydraulic power unit comprising a rear face and a front face spaced from one another includes an air inlet configured to receive air into the unit, and an air outlet configured to expel the air received into the unit. The hydraulic power unit further includes controls configured to provide a user interface. The controls and the air inlet are located on the front face, and the air outlet is located on the rear face. A coupler for a hydraulic power unit, configured to couple a drive shaft of the unit to a pump shaft of a hydraulic pump, includes a first aperture configured to receive the drive shaft, a second aperture configured to receive the pump shaft, and a hub configured to be received in a fan. The hub is configured to fixedly couple to the fan so that the fan is driven by the drive shaft.

20 Claims, 8 Drawing Sheets

(56) References Cited

U.S. PATENT DOCUMENTS

| | | |
|---|---|---|
| 4,859,886 A | 8/1989 | Tanaka et al. |
| 4,907,546 A | 3/1990 | Ishii et al. |
| 5,207,187 A | 5/1993 | Kurohara et al. |
| 5,546,901 A | 8/1996 | Acker et al. |
| 5,624,589 A | 4/1997 | Latvis et al. |
| 5,626,105 A | 5/1997 | Locke et al. |
| 5,890,460 A | 4/1999 | Ball et al. |
| 6,039,009 A | 3/2000 | Hirose |
| 6,181,019 B1 | 1/2001 | Frank |
| 6,313,543 B1 | 11/2001 | Frank |
| 6,917,121 B2 | 7/2005 | Akimoto et al. |
| 6,952,056 B2 | 10/2005 | Brandenburg et al. |
| 6,998,725 B2 | 2/2006 | Brandenburg et al. |
| 7,023,101 B2 | 4/2006 | Wang |
| 7,398,747 B2 | 7/2008 | Onodera et al. |
| 7,642,487 B2 | 1/2010 | Silvestro |
| 7,743,739 B2 | 6/2010 | Kochi et al. |
| 7,861,537 B2 | 1/2011 | Givens |
| 7,868,269 B2 | 1/2011 | Silvestro |
| 8,210,133 B2 | 7/2012 | Hirose et al. |
| 8,232,660 B2 | 7/2012 | Ito et al. |
| 8,328,530 B2 | 12/2012 | Fronzoni |
| 2008/0202447 A1* | 8/2008 | Kochi .................... F02B 63/04 123/2 |
| 2009/0121492 A1* | 5/2009 | Ito ........................... F02B 63/04 290/1 B |
| 2011/0214423 A1 | 9/2011 | Givens |

FOREIGN PATENT DOCUMENTS

| | | |
|---|---|---|
| GB | 1 590 986 A | 6/1981 |
| GB | 1 590 987 A | 6/1981 |
| GB | 2 356 900 B | 12/2003 |
| ZA | 7903620 A | 7/1980 |

* cited by examiner

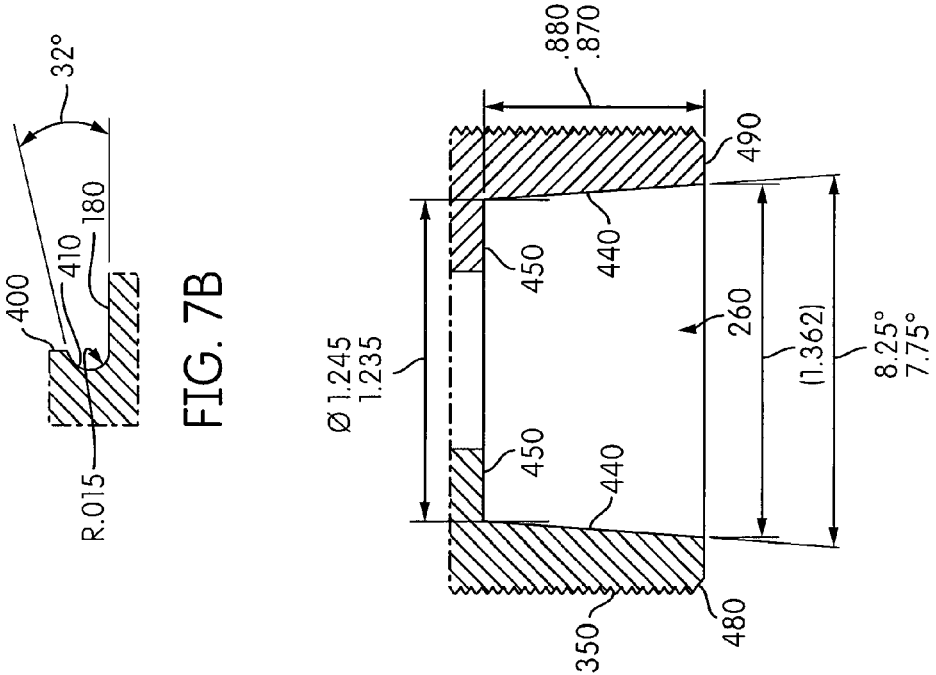
FIG. 7B
FIG. 7C
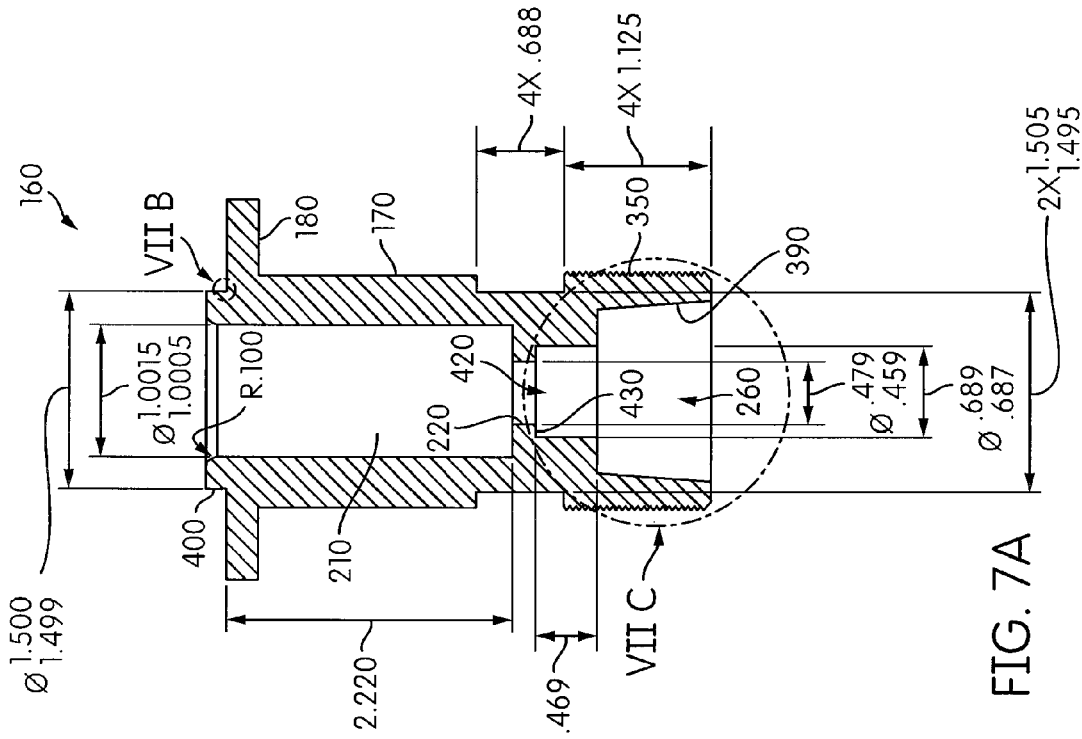
FIG. 7A

HYDRAULIC POWER UNIT

FIELD OF THE INVENTION

The present invention relates generally to power units for hydraulic powered tools.

BACKGROUND OF THE INVENTION

Hydraulic power units serve as power supplies for hydraulic tools, and generate a flow of hydraulic fluid utilized to power such tools. Typically, some hydraulic power units contain an internal combustion engine, a hydraulic pump (e.g., a gear pump), and similar assemblies which provide output of hydraulic fluid (e.g., hydraulic oil) through hoses that may be coupled to hydraulic tools to power those tools.

In some conventional hydraulic power units, a power take-off (PTO) shaft associated with the internal combustion engine may drive a fan, such as a squirrel cage fan, to draw air from outside of the hydraulic power unit. The air may be utilized to pressurize the volute, and be utilized in an air-to-oil intercooler to cool the hydraulic circuit from the heat generated by the hydraulic tools. It may be appreciated that some conventional hydraulic power units, such as that marketed as the Stanley GT18, may be configured so that an air flow to the air-to-oil intercooler may be drawn from outside of the power unit (e.g., ambient air), which may be cooler than air drawn across the engine, or been recirculated from engine cooling air or exhaust air, as utilized in other conventional embodiments.

Among other things, the present application relates to an improved hydraulic power unit design, including being configured with improved air flow to an air-to-oil intercooler, and improved arrangement of the constituent components.

SUMMARY OF THE INVENTION

According to one aspect of this disclosure, a hydraulic power unit comprising a rear face and a front face spaced from one another by at least one side face includes an air inlet configured to receive air into the hydraulic power unit. The hydraulic power unit also includes an air outlet configured to expel the air received into the hydraulic power unit. The hydraulic power unit further includes controls configured to provide a user interface to the hydraulic power unit. The controls and the air inlet are located on the front face, and the air outlet is located on the rear face.

According to another aspect of this disclosure, a coupler for a hydraulic power unit, the coupler configured to couple a drive shaft of the hydraulic power unit to a pump shaft of a hydraulic pump, includes a first aperture configured to receive the drive shaft, a second aperture configured to receive the pump shaft, and a hub configured to be received in a fan. The hub is configured to fixedly couple to the fan so that the fan is driven by the drive shaft.

According to another aspect of this disclosure, a hydraulic power unit includes a motor comprising a drive shaft. The hydraulic power unit also includes a fan. The hydraulic power unit additionally includes a hydraulic pump comprising a pump shaft. The hydraulic power unit further includes a coupler configured to couple the drive shaft to the pump shaft and the fan. The coupler includes a first aperture, a second aperture, and a hub. The drive shaft is received in the first aperture, the pump shaft is received in the second aperture, and the fan is fixedly coupled to the hub and surrounds the hub.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of hydraulic power units in accordance with one or more embodiments are shown in the drawings, in which like reference numerals designate like elements. The drawings form part of this original disclosure in which:

FIGS. 7A-E illustrate various views, including sectional views and enlargements, of the coupler of FIG. 5.

DETAILED DESCRIPTION OF THE ILLUSTRATED EMBODIMENT(S)

Figure 1:
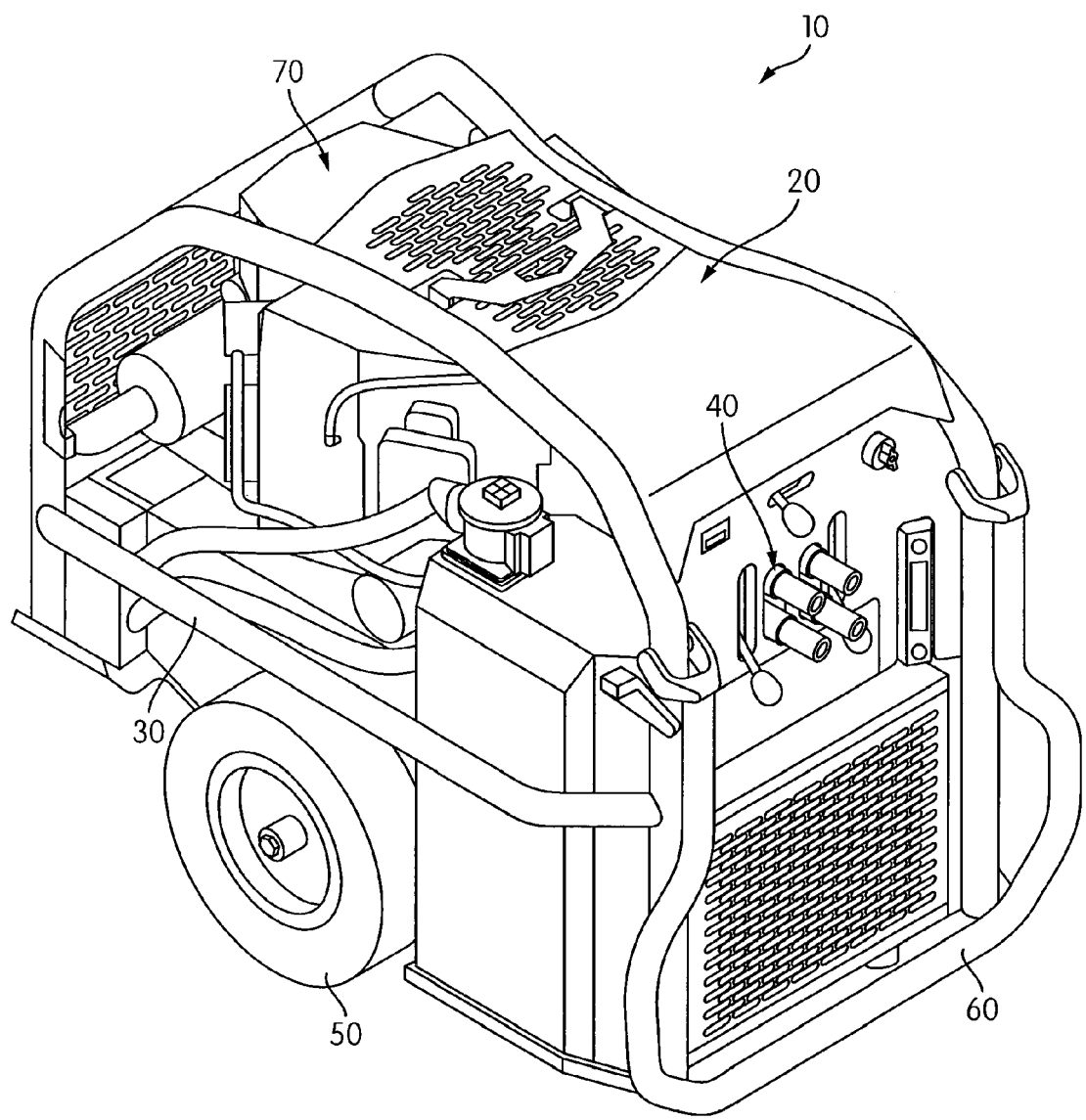
FIG. 1 illustrates a perspective view of a hydraulic power unit according to an aspect of the present disclosure.

FIG. 1 illustrates a perspective view of a hydraulic power unit 10 of the present disclosure. The hydraulic power unit 10 may include a housing 20, including a support frame 30, configured to surround and support the constituent components of the hydraulic power unit 10. As shown in FIG. 1, the hydraulic power unit 10 may include controls 40 (e.g., a control panel), which may facilitate a user interface for the hydraulic power unit 10. In an embodiment, the controls 40 may be configured to facilitate turning the hydraulic power unit 10 on or off, and adjusting settings thereof. In an embodiment, such as that shown, the controls 40 may also include hydraulic fluid outlets and inlets to facilitate creation of a hydraulic circuit, as described in greater detail below. In an embodiment, the hydraulic power unit 10 may also include one or more wheels (e.g., wheels 50), which may facilitate movement of the hydraulic power unit 10. In an embodiment, a portion of the support frame 30 may form a graspable surface which a user may lift to balance the hydraulic power unit 10 on the wheels 50, to facilitate movement hereof via the wheels 50. In the illustrated embodiment, the hydraulic power unit 10 includes a handle 60 which may be used to manipulate positioning of the hydraulic power unit 10 when it is lifted to rest on the wheels 50. The hydraulic power unit 10 may include a rest surface on a bottom surface thereof, offset from the wheels (e.g., between the wheels 50 and the handle 60). Accordingly, the hydraulic power unit 10 may generally rest on a support surface (e.g., the ground), with contact made by the wheels 50 and the rest surface. To move the hydraulic power unit 10, however, a user may lift the hydraulic power unit 10 via the handle 60, lifting the rest surface from the support surface, so that contact with the support surface is generally via the wheels 50. By pushing or pulling the hydraulic power unit 10 (e.g., via the handle 60), the hydraulic power unit 10 may be moved via the wheels 50, similar to the movement of a wheelbarrow. It may be appreciated that in some embodiments, including the illustrated embodiment, the handle 60 may be configured to pivot relative to the housing 20, so as to selectively extend therefrom.

As described in greater detail below, the hydraulic power unit 10 may include an internal combustion engine 70 configured to generate a flow of hydraulic fluid. While the internal combustion engine 70, fueled by gasoline or another hydrocarbon, is present in the illustrated embodiment of the hydraulic power unit 10, in other embodiments other motors or mechanisms for converting potential energy into mechanical energy to ultimately power the hydraulic power unit 10 may alternatively be utilized. For example, in other embodiments the hydraulic power unit 10 may include a battery pack, or other source of electric charge, to drive an electric motor. The functionality of the hydraulic power unit 10 in creating a flow of hydraulic fluid from the operation of the internal combustion engine 70 is described in greater detail below.

Figure 2:
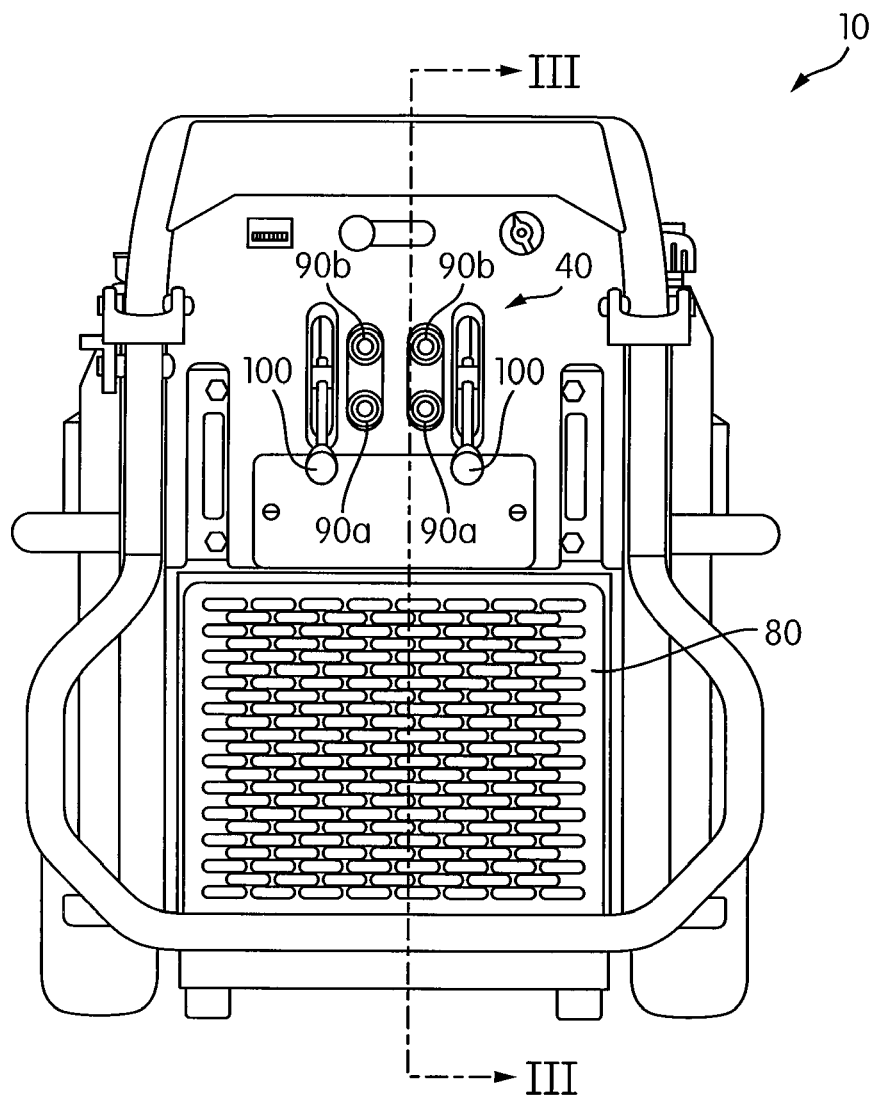
FIG. 2 illustrates a front view of the hydraulic power unit of FIG. 1.

As shown in FIG. 2, an air inlet 80 of an airflow system may be positioned adjacent to the controls 40. For example, in the illustrated embodiment, the air inlet 80 is positioned directly underneath the controls 40. In other embodiments, the air inlet 80 may surround and/or be to the sides of the controls 40. In an embodiment, the air inlet 80 may share a common face with the controls 40. It may be appreciated that by positioning the air inlet 80 adjacent to the controls 40, it may be less likely that the air inlet 80 would be blocked when the hydraulic power unit 10 is positioned in a desired location. For example, hydraulic power units are often positioned in the bed of a truck or another confined space. If the air inlet were to be positioned on another face of the hydraulic power unit 10, a user positioning the hydraulic power unit 10 against a wall, or in an enclosed area may in some cases block the air inlet, cause reduced airflow, or promote recirculation of heated air (e.g., where heated exhaust air may be received in the air inlet, reducing the cooling abilities relative to receiving ambient air therein), FIG. 2 illustrates a front view of the hydraulic power unit 10, facing the controls 40 and the air inlet 80. As shown, the air inlet 80 may include a grill pattern which may prevent the air flow into the air inlet 80 from carrying debris into the hydraulic power unit 10. As further shown, the controls 40 may include fluid outlets 90a and fluid inlets 90b, which may couple to a hydraulic powered tool to complete a hydraulic circuit therewith. As shown, in an embodiment each set of fluid outlets 90a and fluid inlets 90b may be associated with a mechanism for activating a flow of hydraulic fluid from the fluid outlet 90a (which may pass through the hydraulic tool, and return to the fluid inlet 90b). In the illustrated embodiment, the mechanism comprises a lever 100, but other mechanisms for starting or stopping the flow of hydraulic fluid may alternatively be utilized. In an embodiment the controls 40 may include information gages such but not limited to timers indicating time of operation, fuel gages for the internal combustion engine 70, or other such indicators. Further shown in FIG. 2 is a section line III, illustrating the cross sectional view shown in greater detail in FIG. 3.

Figure 3:
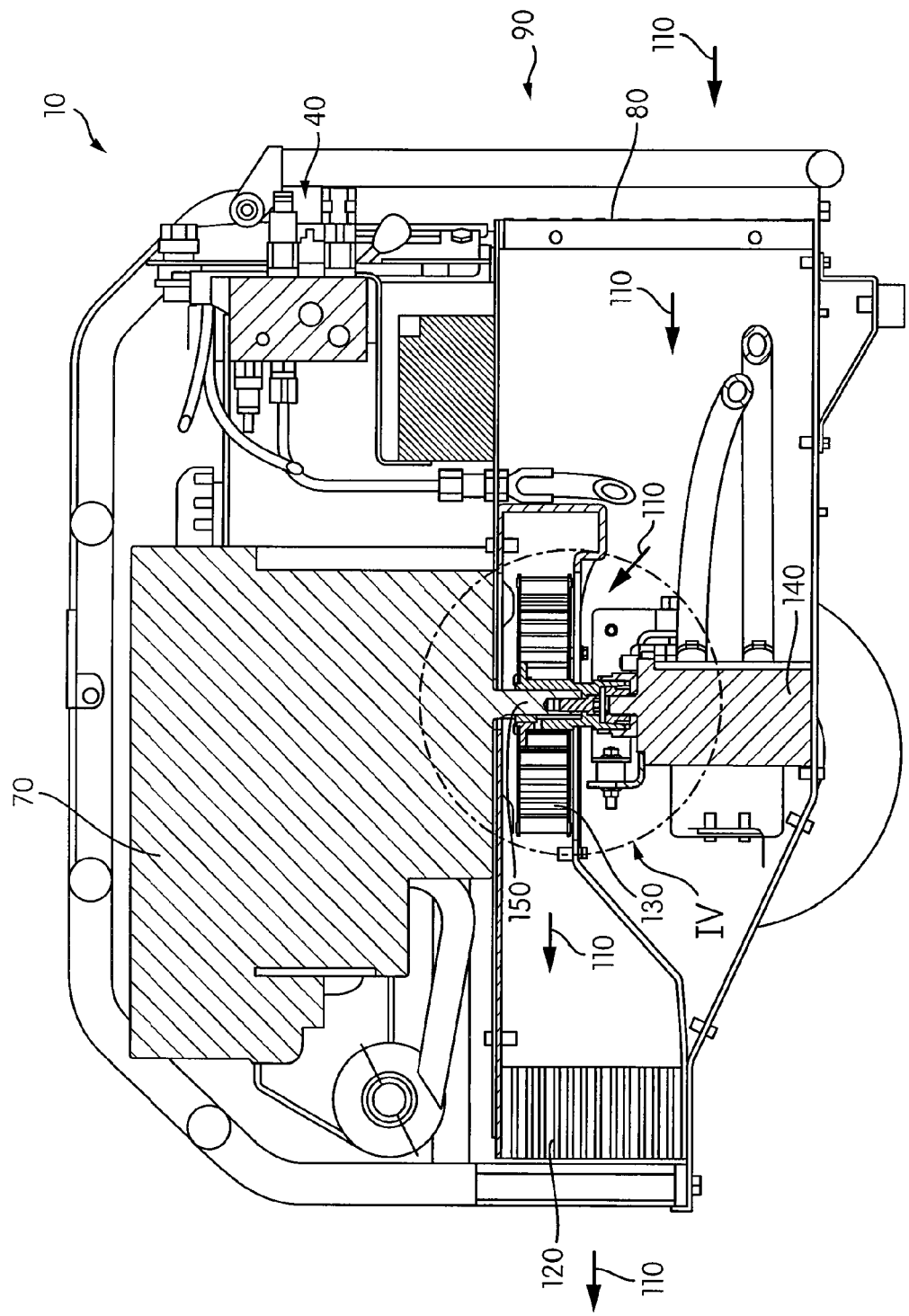
FIG. 3 illustrates a cross sectional side view of the hydraulic power unit of FIG. 1.

As illustrated in the cross sectional view of FIG. 3, in an embodiment the internal combustion engine 70 may be mounted on top of an air flow path 110 that extends from the air inlet 80 located underneath the controls 40 to an air outlet 120 located horizontally opposite the air inlet 80 (e.g., on an opposite face of the hydraulic power unit 10). It may be appreciated that in an embodiment the air outlet 120 may comprise a heat sink (e.g., radiator fins) that the air flow may pass through to dissipate heat associated with the hydraulic fluid and/or other components of the hydraulic power unit 10. In an embodiment, the air outlet 120 may be recessed from the outer rear face of the hydraulic power unit 10, so as to provide a spacing for air discharge (e.g., when the hydraulic power unit is positioned adjacent to a wall). In an embodiment, the air outlet 120 may be baffled in a multi-direction baffle, which may further facilitate output of exhaust air without creating pressure within the air flow path 110.

In an embodiment, a fan 130 located in the air flow path 110 may generate the air flow therethrough. In an embodiment, the fan 130 may comprise a squirrel cage fan configured to pressurize air received from the air inlet 80, and push it through the volute 135 thereof. In an embodiment, the fan 130 may be configured as an axial suction radial discharge fan, such that a flow of air generated by the fan 130 may enter the air inlet 80, pass over the hydraulic fluid lines within the air flow path 110 (which may couple to the fluid outlets 90a and fluid inlets 90b), enter the fan 130 through a bottom surface thereof, be expelled from the fan 130 through a side surface thereof, and pass through the air outlet 120, dissipating heat from the hydraulic power unit 10 in the process. As shown, in an embodiment a hydraulic pump 140 may be coupled to the air outlet 120 (e.g., to the heat sink thereof), so that the heat of the hydraulic fluid pumped by the hydraulic pump 140 may be transferred from the hydraulic fluid to the air, which may then be blown out of the air outlet 120 by the air flow in the air flow path 110. The coupling of the hydraulic pump 140 to the air outlet 120 may vary across embodiments, and may be in any appropriate configuration to transfer heat from the hydraulic fluid to the air outlet 120. For example, in an embodiment the hydraulic fluid may be pumped through the radiator fins of the air outlet 120 to transfer heat from the hydraulic fluid to the radiator fins. In another embodiment, a thermally conductive material may join the hydraulic pump 140 or another component associated with the hydraulic fluid to the air outlet 120. While in the illustrated embodiment the hydraulic fluid lines and the hydraulic pump 140 are themselves positioned in the air flow path 110, and some heat emanating from the casings thereof may be drawn into the air flow generated by the fan 130, such positioning is optional, and may be omitted in other embodiments. Accordingly, it may be appreciated that in an embodiment the heat sync of the air outlet 120 may have air passed over it by the fan 130, to transfer heat out of the hydraulic fluid into the air. The hydraulic fluid may flow in a continuous circuit that includes the hydraulic pump 140, the tool powered by the hydraulic power unit 10, and the heat sync, so that heat in the hydraulic fluid created by the tool and/or the hydraulic pump 140 may be cooled by the heat sync. While in the illustrated embodiment the heat sync is adjacent to or within the air outlet 120, other positioning of the heat sync may be implemented in other embodiments, such as elsewhere between the fan 130 and the air outlet 120.

As shown, it may be appreciated that the internal combustion engine 70 of the hydraulic power unit 10 may be configured with a vertically oriented drive shaft 150. As described in greater detail below, the vertically oriented drive shaft 150 may be coupled to the fan 130 and the hydraulic pump 140 located in the air flow path 110, so as to drive both of these components. In an embodiment the fan 130 and the hydraulic pump 140 may also be vertically oriented, so as to be directly driven by the rotation of the vertically oriented drive shaft 150. In some embodiments, the vertically oriented drive shaft 150 driving both the fan 130 and the hydraulic pump 140 may be the sole drive shaft of the internal combustion engine 70. For example, instead of the internal combustion engine 70 including a drive shaft associated with the fan 130 and a drive shaft associated with the hydraulic pump 140 (e.g., by being positioned therebetween), or make use of a stub shaft, both the fan 130 and the hydraulic pump 140 may be coupled to and driven by the drive shaft 150, as illustrated in the embodiment of FIG. 3. Accordingly, in an embodiment an axis of rotation for the drive shaft 150, the fan 130, and/or a shaft of the hydraulic pump 140 may be vertically oriented.

Figure 4:
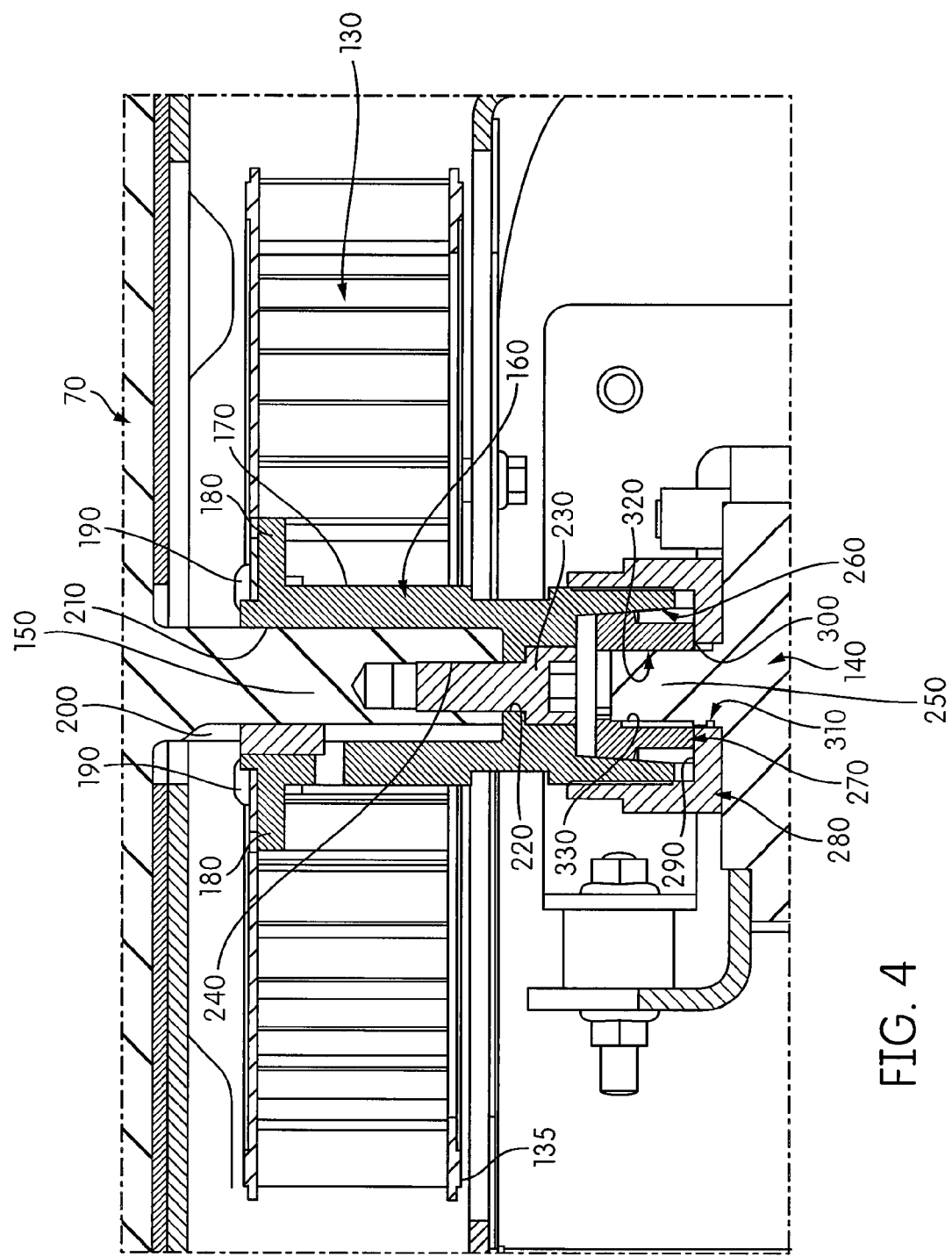
FIG. 4 illustrates an enlargement of a region of the view of FIG. 3.

FIG. 3 also depicts a region IV enlarged in FIG. 4. As shown in FIG. 4, the drive shaft 150 may extend into a coupler 160 configured to couple between the drive shaft 150, the fan 130, and the hydraulic pump 140. As shown, in the illustrated embodiment the coupler 160 comprises a hub 170 around which the fan 130 may mount. In an embodiment, the fan 130 may be bolted to the hub 170, such as at a flange 180 thereof. Specifically, in the illustrated embodiment the flange 180 may include apertures therein configured to receive fasteners 190 that may pass through associated apertures on a flange of the fan 130, as described in greater detail below. As shown, in an embodiment the drive shaft 150 may have a key portion 200 configured to be received in a receiving groove of an interior aperture 210 of the hub 170. Accordingly, it may be appreciated that the engagement between the key portion 200 and the coupler 160 may cause the coupler 160 to rotate along with the drive shaft 150. Furthermore, by being bolted or otherwise fastened to the coupler 160, the fan 130 may similarly rotate along with the coupler 160 and the drive shaft 150.

To secure the coupler 160 to the drive shaft 150, the coupler 160 may be shaped with an internal bore 220 configured to receive a bolt 230 that may be threadedly fastened into a receiving aperture 240 in the drive shaft 150. Other securing mechanisms (e.g., welds or rivets) may additionally or alternatively be utilized to fix the coupler 160 to the drive shaft 150 and facilitate coupled rotation thereof.

In an embodiment, the hydraulic pump 140 may have its own associated pump shaft 250 configured to receive rotational energy to drive the hydraulic pump 140 to create a flow of hydraulic fluid. To couple the hydraulic pump shaft 250 to the coupler 160, and accordingly to the drive shaft 150, coupler 160 may be configured with a pump-side aperture 260, configured to receive the pump shaft 250 therein. In an embodiment, to grip the pump shaft 250 and allow the rotational energy of the drive shaft 150 and the coupler 160 to be transmitted to the pump shaft 250, the coupler 160 may be configured to mate with a block bushing 270 that may be selectively compressed around the pump shaft 250 to lock the block bushing 270 therein.

As described in greater detail below, in an embodiment both the pump-side aperture 260 and the block bushing 270 may include tapered edges (specifically on the inner diameter of the pump-side aperture 260 and the outside diameter of the block bushing 270). It may be appreciated that the coupler 160 may facilitate maintaining an axial alignment of the rotating components of the hydraulic power unit 10 (e.g., the drive shaft 150 and the pump shaft 250). In particular, it may be appreciated that the corresponding tapered edge of the inner diameter of the pump-side aperture 260, and tapered edge on the outside diameter of the block bushing 270 may hold the pump shaft 250 in line with the drive shaft 250, via the coupler 160, by tightening the connection between the pump shaft 250 and the coupler 160 towards the axial center of the coupler 160 (and accordingly, the axial center of the drive shaft 150), as described in greater detail below.

In an embodiment, the block bushing 270 may further include slot extending across its extent (as shown in greater detail below), which may allow the block bushing 270 to be compressed into a more compact configuration, pushing the block bushing 270 further into the pump-side aperture 260, and increase friction therebetween. In an embodiment, such as that illustrated, compression of the block bushing 270 into the pump-side aperture 260 may be accomplished by a coupler nut 280 which may be threadedly fastened onto the coupler 160. As the coupler nut 280 is further secured onto the coupler 160, an inner surface 290 thereof may push onto an outer surface 300 of the block bushing 270, to press the block bushing 270 further into the pump-side aperture 260. It may be appreciated that the inner surface 290 of the coupler nut 280 has an aperture 310 therein through which the pump shaft 250 passes to be received in an aperture 320 of the block bushing 270. As shown, in an embodiment the aperture 320 of the block bushing 270 may be keyed with a recess 330, which may receive a protrusion on the pump shaft 250 to prevent rotation of the block bushing 270 relative to the pump shaft 250. Accordingly, it may be appreciated that in an embodiment, a lack of a keyed interface between the outer perimeter of the block bushing 270 and the inner perimeter of the pump-side aperture 260 may allow for controlled slippage and/or a reduction of torque transmitted from the drive shaft 150 to the pump shaft 250.

Figure 5:
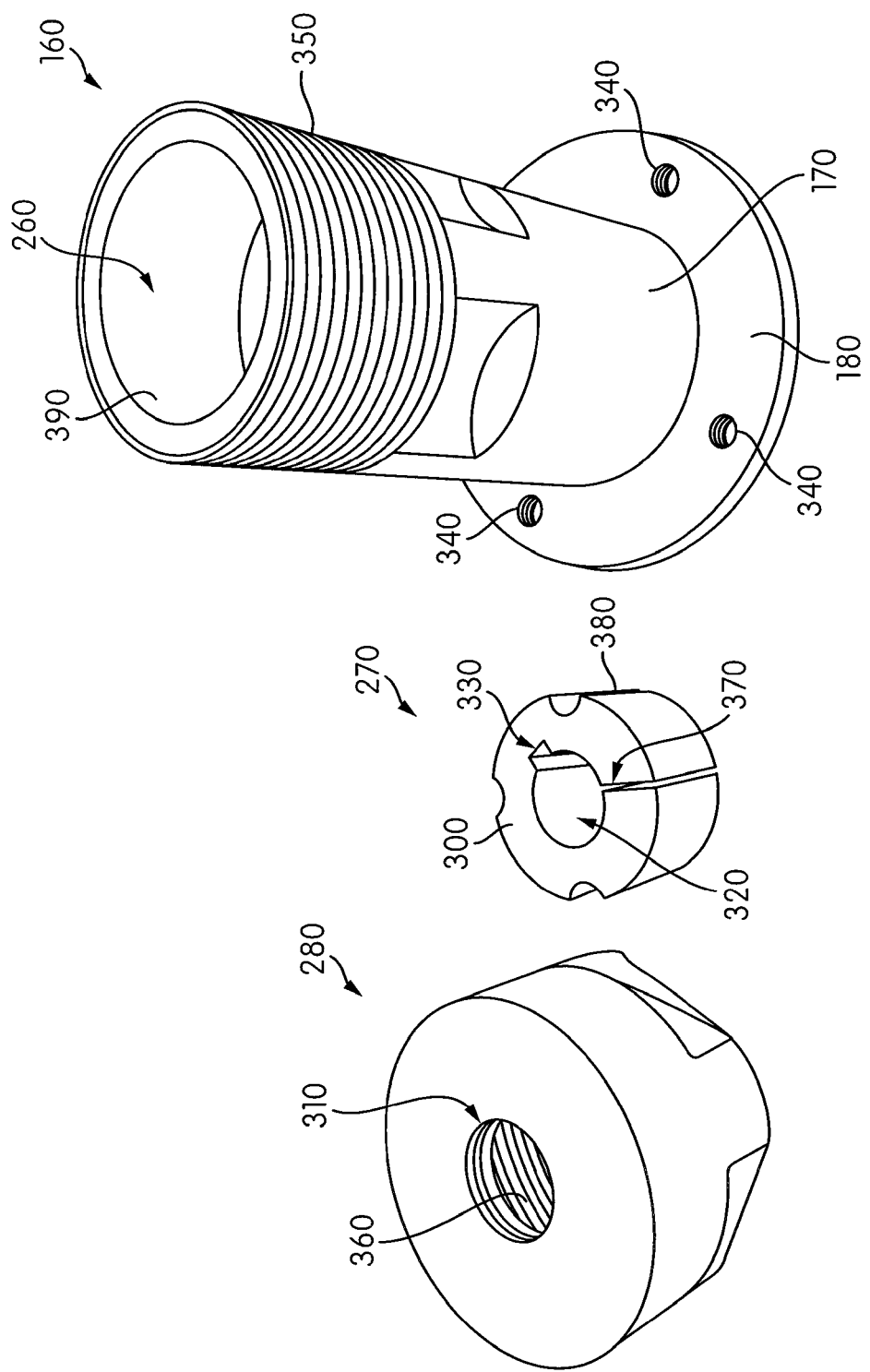
FIG. 5 illustrates an exploded perspective view of a coupler arrangement according to aspects of the present disclosure, including a coupler, a block bushing, and a cap nut.
Figure 6:
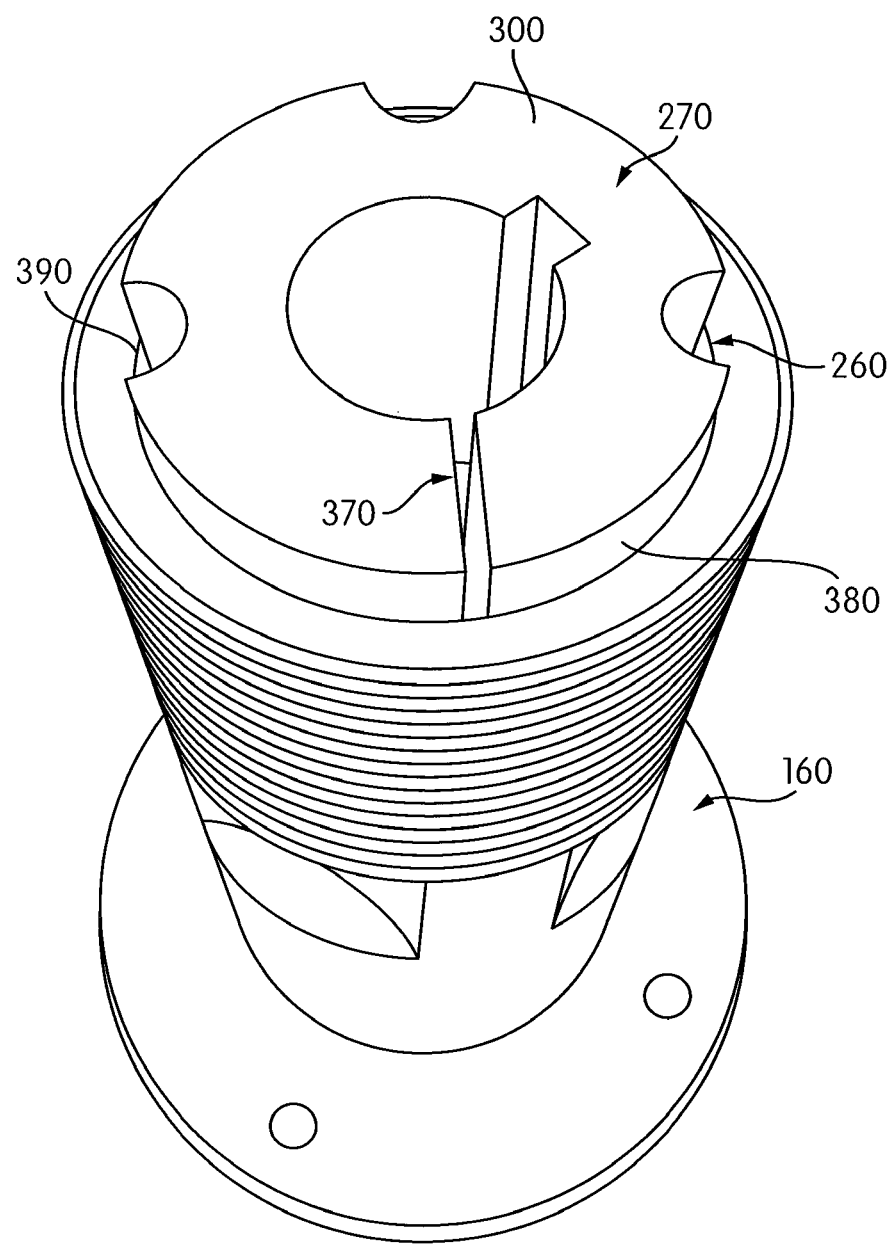
FIG. 6 illustrates the block bushing of FIG. 5 as inserted into the coupler.

FIG. 5 illustrates the coupler 160, the block bushing 270, and the coupler nut 280 disassembled from one another. As shown, the flange 180 of the coupler 160 may include apertures 340 therein configured to receive the fasteners 190 to secure the fan 130 about the hub 170 of the coupler 160. As further shown, an outer perimeter 350 of the coupler 160 surrounding the pump-side aperture 260 may be threaded so as to engage a complementary threaded inner surface 360 of the coupler nut 280. As further shown in FIG. 5, the block bushing 270 may include a slit 370 therethrough, extending from an inner surface defining the aperture 320 to an outer perimeter 380 thereof. It may be appreciated that the outer perimeter 380 may be shaped to be received in an inner perimeter 390 of the coupler 160 that defines the pump-side aperture 260. FIG. 6 illustrates an embodiment of the block bushing 270 received in the pump-side aperture 260. As described in greater detail below, the outer perimeter 380 of the block bushing 270 and the inner perimeter 390 defining the pump-side aperture 260 may be correspondingly tapered, such that forcing the block bushing 270 further into the pump-side aperture 260 (e.g., by pressing on the outer surface 300) may cause compression of the block bushing 270, specifically at the slit 370, to achieve the desired coupling between the block bushing 270 (which would be fixed relative to the pump shaft 250 by the keyed engagement of the pump shaft 250 to the aperture 320 and the recess 330) and the coupler 160.

Figures 7D, 7E:
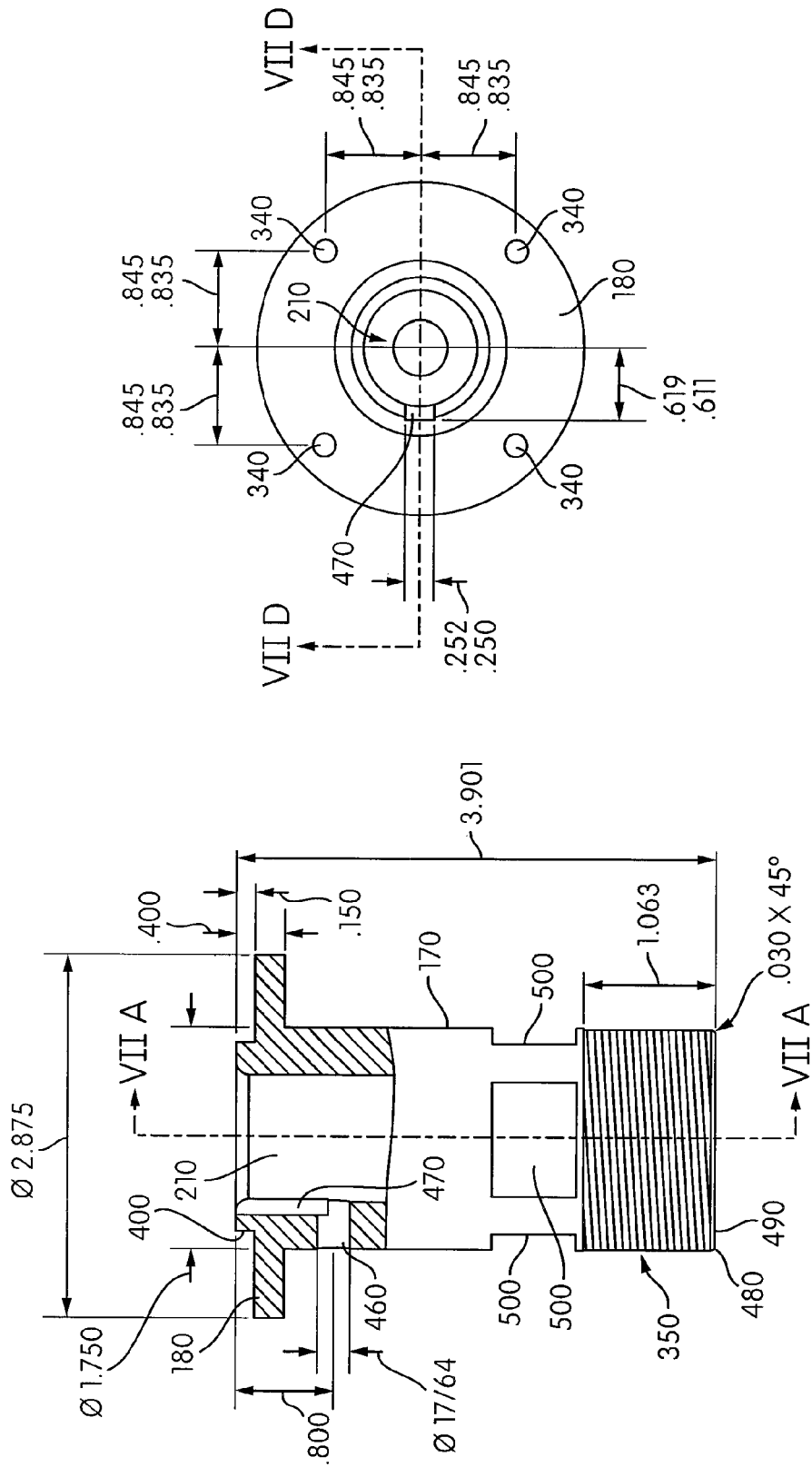

FIGS. 7A-E illustrate isolated and reduced cross sectional views of an embodiment of the coupler 160, to illustrate contours according to an embodiment thereof. Measurements (in inches) are illustrated therein, however may be understood as being merely exemplary. In some embodiments, the measurements thereof may be scaled larger or smaller relative to those illustrated. In some embodiments, one or more of the measurements may be larger or smaller, depending on the sizes of the constituent components. It may be appreciated that the diameter ranges may be within the listed tolerances in some embodiments, or may be within tolerances that are larger by any appropriate amount. In the illustrated embodiment, as shown in FIG. 7A, a lip 400 of the coupler 160 may have a diameter of approximately 1.499-1.500 inches (including the diameter of the interior aperture 210). The interior aperture 210 configured to receive the drive shaft 150 may extend through the lip 400 and into the hub 170, as described above. In the illustrated embodiment, the interior aperture 210 may have a diameter of approximately 1.0005-1.0015 inches. It may be appreciated that the general diameter measurements associated with the coupler 160 may be exclusive of the keyed regions thereof, such as those configured to receive the key portion 200 of the drive shaft 150. In an embodiment, the portion of the lip 400 extending into the interior aperture 210 may be curved. In the illustrated embodiment, the radius of the curvature is 0.100 inches.

As shown as region VIIB in FIG. 7A, and enlarged in FIG. 7B, a portion of the lip 400 as it joins with a face of the flange 180 facing an opening of the interior aperture 210 may include a groove 410 therein (e.g., extending into the perimeter of the lip 400). In the illustrated embodiment, the groove 410 may have a radius of curvature of 0.015 inches, and may have an angled opening therein. For example, in the illustrated embodiment, the angled opening may form an angle relative to the flange 180 of approximately 32 degrees. It may be appreciated that these measurements are merely exemplary, and may be larger or smaller in various embodiments. It may be appreciated that the groove 410 may be for any purpose, including but not limited to being a tooling relief for machining of the coupler 160, and/or being engageable for the coupling of components to the coupler 160.

As described above, the drive shaft 150 may be received in the interior aperture 210, and may itself contain a receiving aperture 240 configured to receive the bolt 230 therein to secure the coupler 160 to the drive shaft 150. Accordingly, as shown in FIG. 7A, in an embodiment, the coupler 160 may be configured with a securement aperture 420 configured with the internal bore 220 shaped to receive the bolt 230. The internal bore 220 may have a smaller diameter than the remainder of the securement aperture 420, so as to define an engagement surface 430 therein, against which the head of the bolt 230 may engage while the shaft of the bolt 230 passes through the internal bore 220 and is received in the internal aperture 240 of the drive shaft 150. In an embodiment, the interior aperture 210, the securement aperture 420, and the pump-side aperture 260 may define a common opening extending through the coupler 160.

FIG. 7C, which shows in enlarged form region VIIC of FIG. 7A, illustrates in greater detail the pump-side aperture 260 of the coupler 160. As described above, in an embodiment the pump-side aperture 260 may have a tapered configuration, such that side surfaces 440 thereof may form an obtuse angle with a bottom surface 450 therein. As shown in the illustrated embodiment, the side surfaces 440 may form an angle approximately 7.75-8.25 degrees greater than perpendicular to the bottom surface 450 (e.g., 97.75-98.25 degrees relative to the bottom surface 450). As such, in an embodiment the diameter of the interior aperture 260 may be approximately 1.235-1.245 inches proximal to the bottom surface 450, however may be approximately 1.362 inches proximal to the opening of the interior aperture 260. It may be appreciated that the block bushing 270 may be configured with a corresponding size and shape at the outer perimeter 380 thereof, or may be configured to form such a shape when compressed so as to close the slit 370, so as to form the desired interface between the block bushing 270 and the coupler 160.

Finally, FIG. 7D and FIG. 7E illustrate other views of the illustrated embodiment of the coupler 160, with other exemplary measurements associated therewith. It may be appreciated that section line VIIA in FIG. 7D may show the cross sectional view of FIG. 7A, while section line VIID of FIG. 7E may show the partial cross sectional view of FIG. 7D. Again, the illustrated measurements and ranges are not to be considered limiting in any way.

FIG. 7D illustrates a partial cross sectional view of the coupler 160, showing a portion of the hub 170, sectioned to show in cross sectional form the interior aperture 210. As shown, the diameter of the hub 210 may generally be approximately 1.750 inches in an embodiment. The flange 180 protruding therefrom may extend outwards to a diameter of approximately 2.875 inches in an embodiment. Additionally, the flange 180 may in an embodiment be approximately 0.400 inches. In an embodiment, the lip 400 may extend from the proximal surface of the flange 180 by approximately 0.150 inches. As shown in the view of FIG. 7D, in an embodiment an aperture 460 may extend through the hub 170 into a keyed receiving groove 470 extending from the interior aperture 210, which may prevent rotation of the coupler 160 relative to the drive shaft 150. In an embodiment, the aperture 460 may be configured as a tooling relief utilized in machining the coupler 160. In an embodiment, the aperture 460 may be centered approximately 0.800 inches into the coupler 160, inward from a topmost surface of the lip 400 surrounding the opening of the interior aperture 210.

As further shown in FIG. 7D, in an embodiment the outer perimeter 350 of the coupler 160 surrounding the pump-side aperture 260 that is threaded to receive the coupler nut 280 may be approximately 1.063 inches in an embodiment, and may terminate with a beveled edge 480 adjacent to the opening of the pump-side aperture 260. In the illustrated embodiment, the beveled edge may extend at a 45 degree angle between the outer perimeter 350 and a bottom surface 490 of the coupler 160 (surrounding the pump-side aperture 260). In an embodiment, the beveled edge may be approximately 0.030 inches long. In an embodiment, a length of the coupler 160 may be approximately 3.901 inches. As further shown in FIG. 7D, in an embodiment the coupler 160 may have grip regions 500 formed alongside otherwise curved regions of the hub 170, which may form a surfaces that may be grasped by a wrench or similar tool so as to grip for facilitating tightening of the cap nut 280 onto the coupler 160. It may be appreciated that in an embodiment the cap nut 280 may similarly include such grip regions. In an embodiment, there may be at least two regions opposite one another (or, in the illustrated embodiment, four grip 500 regions squared relative to one another), and extending generally parallel to one another, so as to be grasped by the head of the wrench. Accordingly, holding the coupler 160 at the grip regions 500, and rotating the cap nut 280 thereon by engaging the cap nut 280 at its associated grip regions, may facilitate sufficient application of force to drive the cap nut 280 onto the coupler 160, compressing the block bushing 270 to fit further into the interior aperture 260. It may be appreciated that other configurations for holding the coupler 160 and the coupler nut 280 may be implemented in other embodiments. For example, in an embodiment one or more of the coupler 160 and the coupler nut 280 may be configured to be engaged by a spanner wrench, such as (but not limited to) a pin spanner wrench, a hook spanner wrench, or a U/C-shaped spanner wrench. Still other mechanisms for coupling the coupler 160 and the coupler nut 280 are alternatively possible in various embodiments, beyond those discussed herein.

FIG. 7E illustrates a top view of the coupler 160 facing the inner aperture 210. As shown, there may be four apertures 340 therein configured to receive the fasteners 190 to secure the fan 130 about the hub 170 of the coupler 160. In an embodiment, each of the apertures 340 may be spaced in two perpendicular directions relative to a center axis of the coupler 160 on the flange 180, approximately 0.835-0.845 inches in both a first direction and a second direction. Additionally, in an embodiment the keyed receiving groove 470 extending from the interior aperture 210 may be approximately 0.250-0.252 inches in length, and may extend into the lip 400 and hub 170 approximately 0.611-0.619 inches relative to the center axis of the coupler 160. Again, these measurements are merely exemplary, and are not to be considered limiting in any way.

It may be appreciated that the components described herein may be of different constructions or configurations, including but not limited to one or more being comprised of different material choices. For example, the components described herein may each be constructed from a variety of materials, including but not limited to one or more plastics, metals, rubbers, elastomers, or any other appropriate material choice. For example, in an embodiment one or more of the components (including, but not limited to, one or more of the coupler 160, the block bushing 270, and the coupler nut 280) may be formed of aluminum (e.g., machined aluminum), iron (e.g., steel), or any other appropriate material. In some embodiments, the material choices may differ from component to component. For example, in an embodiment, the coupler 160 and/or the coupler nut 280 may be formed of machined aluminum, while the block bushing 270 may be formed of steel. It may be appreciated that the materials of the coupler 160 and the block bushing 270 may be selected to form a desired interface therebetween in some embodiments.

Although aspects of the invention have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A hydraulic power unit comprising:
   a motor comprising a drive shaft;
   a fan;
   a hydraulic pump comprising a pump shaft; and
   a coupler configured to couple the drive shaft to the pump shaft and the fan, the coupler comprising a first aperture, a second aperture, and a hub;
   wherein the drive shaft is received in the first aperture, the pump shaft is received in the second aperture, and the fan is fixedly coupled to the hub and surrounds the hub.

2. The hydraulic power unit of claim 1, further comprising:
   a rear face and a front face spaced from one another by at least one side face
   an air inlet configured to receive air into the hydraulic power unit;
   an air outlet configured to expel the air received into the hydraulic power unit; and
   controls configured to provide a user interface to the hydraulic power unit;
   wherein the controls and the air inlet are located on the front face, and the air outlet is located on the rear face.

3. The hydraulic power unit of claim 2, wherein the fan is located between the air inlet and the air outlet.

4. The hydraulic power unit of claim 2, wherein the air outlet comprises radiator fins configured to radiate heat from hydraulic fluid utilized by the hydraulic power unit.

5. The hydraulic power unit of claim 2, wherein the air inlet is aligned with the air outlet across the hydraulic power unit, creating an air flow path therebetween.

6. The hydraulic power unit of claim 2, wherein the air outlet is recessed from a housing of the hydraulic power unit at the rear face of the hydraulic power unit.

7. The hydraulic power unit of claim 2, further comprising a handle and one or more wheels to facilitate movement of the hydraulic power unit.

8. The hydraulic power unit of claim 7, wherein the hydraulic power unit is configured to be supported on a support surface via the one or more wheels and a rest surface, and wherein lifting the hydraulic power unit by the handle lifts the rest surface from the support surface.

9. The hydraulic power unit of claim 1, wherein the fan is an axial suction radial discharge fan.

10. The hydraulic power unit of claim 1, wherein an axis of rotation for the fan is vertically oriented.

11. The hydraulic power unit of claim 1, wherein the second aperture is configured to receive a block bushing therein, the block bushing configured to fixedly couple to the pump shaft.

12. The hydraulic power unit of claim 11, wherein the second aperture and the block bushing are tapered outward facing the hydraulic pump.

13. The hydraulic power unit of claim 12, wherein the block bushing is configured to compress to be received deeper into the second aperture.

14. The hydraulic power unit of claim 13, wherein an outer perimeter of the coupler surrounding the second aperture is configured to receive a coupler nut.

15. The hydraulic power unit of claim 14, wherein the outer perimeter of the coupler and an inner perimeter of the coupler nut are threaded, and wherein threaded engagement of the coupler nut and the coupler is configured to press the block bushing into the second aperture.

16. The hydraulic power unit of claim 1, wherein the coupler comprises machined aluminum and the block bushing comprises steel.

17. The hydraulic power unit of claim 1, wherein the drive shaft is configured to directly drive the hydraulic pump of the hydraulic power unit.

18. A coupler for a hydraulic power unit, the coupler configured to couple a drive shaft of the hydraulic power unit to a pump shaft of a hydraulic pump, the coupler comprising:
    a first aperture configured to receive the drive shaft;
    a second aperture configured to receive the pump shaft; and
    a hub configured to be received in a fan;
    wherein the hub is configured to fixedly couple to the fan so that the fan is driven by the drive shaft.

19. The coupler of claim 18, further comprising a receiving groove extending from the first aperture, configured to receive a key portion of the drive shaft to fix rotation of the coupler to rotation of the drive shaft.

20. The coupler of claim 18, further comprising a flange extending from the hub, the flange comprising one or more apertures configured to receive one or more fasteners to secure the fan to the coupler.

* * * * *